United States Patent [19]
Green

[11] Patent Number: 5,878,693
[45] Date of Patent: Mar. 9, 1999

[54] CAT LITTER PACKAGING ARTICLE

[76] Inventor: Kelly Lynne Green, 8990 N. Davis Hwy., #163, Pensacola, Fla. 32514

[21] Appl. No.: 934,806

[22] Filed: Sep. 22, 1997

[51] Int. Cl.[6] ...................................................... A01K 1/01
[52] U.S. Cl. ........................................... 119/168; 119/170
[58] Field of Search .................................... 119/167, 168, 119/169, 170

[56] References Cited

U.S. PATENT DOCUMENTS

| | | | |
|---|---|---|---|
| 4,628,863 | 12/1986 | Eichenauer | 119/168 |
| 4,840,140 | 6/1989 | Yananton et al. | 119/169 |
| 5,134,974 | 8/1992 | Houser | 119/168 |
| 5,207,772 | 5/1993 | Lauretta et al. | 119/167 |
| 5,251,573 | 10/1993 | Bremley | 119/168 |
| 5,394,834 | 3/1995 | Queen et al. | 119/168 |
| 5,396,864 | 3/1995 | Mannschreck | 119/174 |

*Primary Examiner*—Michael J. Carone
*Assistant Examiner*—Elizabeth Shaw
*Attorney, Agent, or Firm*—Joseph N. Breaux

[57] ABSTRACT

A cat litter packaging article that includes a plastic film packaging member having a rectangular box shaped litter holding cavity that is accessible through a rectangular shaped opening defined by two longer side perimeter edges and two shorter side perimeter edges, the plastic film packaging member having four adhesive coated tying lobes, one tying lobe extending from each corner formed by the intersection of a longer side and a shorter side perimeter edge; and a quantity of cat litter particles positioned within the litter holding cavity; the two shorter perimeter edges being in registration with each other and sealed together with a removable middle side seam tape, each of the four adhesive coated tying lobes being adhesively secured to another one of the four adhesive coated tying lobes, and each of the two longer perimeter edges being folded in half and sealed together with removable left and right side seam tapes to seal the quantity of cat litter particles within the litter holding cavity.

4 Claims, 2 Drawing Sheets

CAT LITTER PACKAGING ARTICLE

TECHNICAL FIELD

The present invention relates to cat litter packaging and more particularly to a cat litter packaging article that includes a plastic film packaging member having a rectangular box shaped litter holding cavity that is accessible through a rectangular shaped opening defined by two longer side perimeter edges and two shorter side perimeter edges, the plastic film packaging member having four restickable adhesive coated tying lobes, one tying lobe extending from each corner formed by the intersection of a longer side and a shorter side perimeter edge; and a quantity of cat litter particles positioned within the litter holding cavity; the two shorter perimeter edges being in registration with each other and sealed together with a removable middle side seam tape, each of the four restickable adhesive coated tying lobes being adhesively secured to another one of the four restickable adhesive coated tying lobes, and each of the two longer perimeter edges being folded in half and sealed together with removable left and right side seam tapes to seal the quantity of cat litter particles within the litter holding cavity.

BACKGROUND OF THE INVENTION

Disposing of used cat litter can be an unpleasant experience for many cat owners. It would be a benefit, therefore, to these cat owners to have a cat litter packaging article that contained a litter box quantity of cat litter and that could be used as a cat litter box liner as well as a sealable disposal bag for disposing of the used cat litter.

SUMMARY OF THE INVENTION

It is thus an object of the invention to provide a cat litter packaging article that contains a litter box quantity of cat litter and that can be used as a cat litter box liner as well as a sealable disposal bag for disposing of the used cat litter.

It is a further object of the invention to provide a cat litter packaging article that includes a plastic film packaging member having a rectangular box shaped litter holding cavity that is accessible through a rectangular shaped opening defined by two longer side perimeter edges and two shorter side perimeter edges, the plastic film packaging member having four restickable adhesive coated tying lobes, one tying lobe extending from each corner formed by the intersection of a longer side and a shorter side perimeter edge; and a quantity of cat litter particles positioned within the litter holding cavity; the two shorter perimeter edges being in registration with each other and sealed together with a removable middle side seam tape, each of the four restickable adhesive coated tying lobes being adhesively secured to another one of the four restickable adhesive coated tying lobes, and each of the two longer perimeter edges being folded in half and sealed together with removable left and right side seam tapes to seal the quantity of cat litter particles within the litter holding cavity.

It is a still further object of the invention to provide a cat litter packaging article that accomplishes some or all of the above objects in combination.

Accordingly, a cat litter packaging article is provided. The cat litter packaging article includes a plastic film packaging member having a rectangular box shaped litter holding cavity that is accessible through a rectangular shaped opening defined by two longer side perimeter edges and two shorter side perimeter edges, the plastic film packaging member having four restickable adhesive coated tying lobes, one tying lobe extending from each corner formed by the intersection of a longer side and a shorter side perimeter edge; and a quantity of cat litter particles positioned within the litter holding cavity; the two shorter perimeter edges being in registration with each other and sealed together with a removable middle side seam tape, each of the four restickable adhesive coated tying lobes being adhesively secured to another one of the four restickable adhesive coated tying lobes, and each of the two longer perimeter edges being folded in half and sealed together with removable left and right side seam tapes to seal the quantity of cat litter particles within the litter holding cavity.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
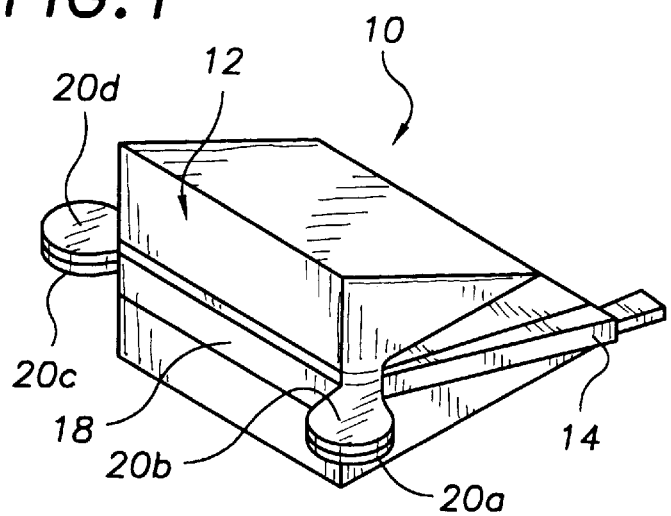
FIG. 1 is a perspective view of an exemplary embodiment of the cat litter packaging article of the present invention showing the plastic film packaging member sealed in the closed configuration by the right side and left side seam tapes (only the left side seam tape shown in the Figure), the middle seam tape, and the four restickable adhesive coated tying lobes.
Figure 1A:
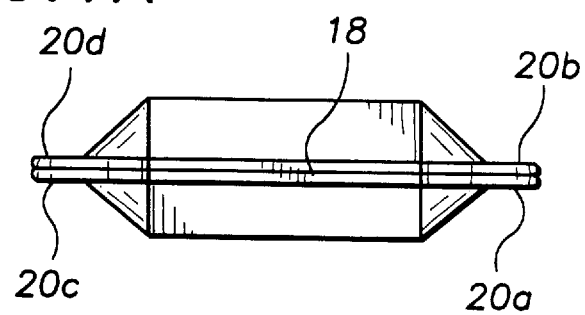
FIG. 1A is a right side plan view of the cat litter packaging article of FIG. 1 showing the plastic film packaging member sealed in the closed configuration showing the right side seam tape and two of the restickable adhesive coated tying lobes adhesively secured together.
Figure 1B:
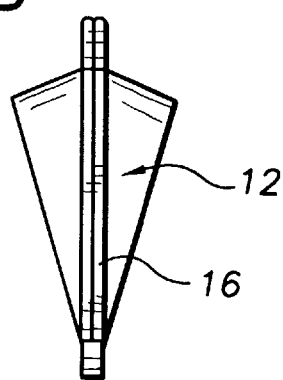
FIG. 1B is a middle side plan view of the cat litter packaging article of FIG. 1 showing the plastic film packaging ember sealed in the closed configuration showing the middle seam tape and the four restickable adhesive coated tying lobes.

FIG. 1 shows an exemplary embodiment of the cat litter packaging article of the present invention generally designated by the numeral 10. Cat litter packaging article 10 includes a two mil thick, plastic film packaging member, generally designated 12, that is sealed in a closed configuration to contain a quantity of cat litter by a right side and a left side seam tape 14,16 (right side seam tape 16 shown in FIG. 1B), a middle seam tape 18, and four restickable adhesive coated, flexible plastic, tying lobes 20*a*,20*b*,20*c*, 20*d*. FIG. 1A shows tying lobe 20*a* adhesively secured to tying lobe 20*b* and tying lobe 20*c* adhesively secured to tying lobe 20*d*. FIG. 2B shows right side seam tape 16 secured to packaging member 12.

Figure 2:
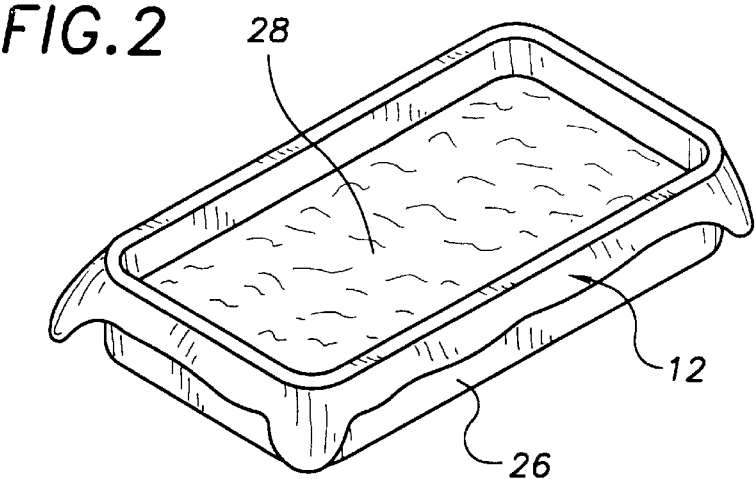
FIG. 2 is a perspective view of the cat litter packaging article of FIG. 1 showing the plastic film packaging member in the open configuration supported in a conventional cat litter pan and having the right side, left side and middle seam tapes removed and discarded, the open plastic film packaging member revealing the supply of cat litter provided therein.
Figure 3:
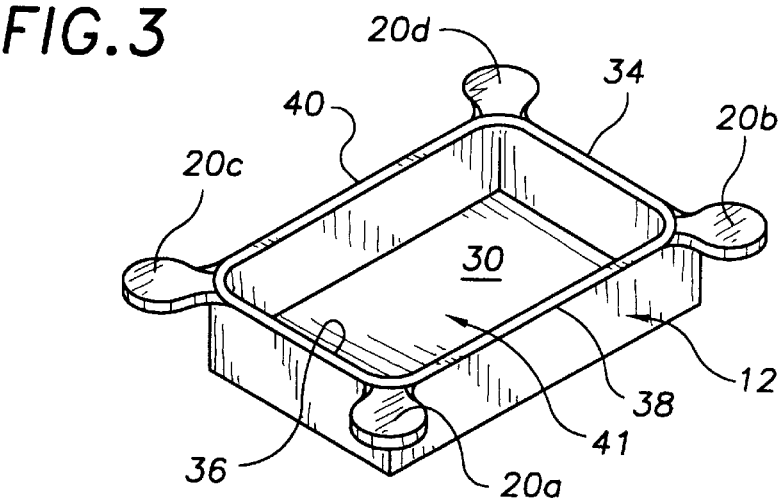
FIG. 3 is a perspective view of the plastic film packaging member of FIG. 2 in isolation with the supply of cat litter removed to show the cat litter cavity.

With reference to FIG. 2, when right side and a left side seam tape 14,16, (FIGS. 1, 1B), and middle seam tape 18 (FIGS. 1 and 1A) are removed from packaging member 12; tying lobe 20*a* detached from tying lobe 20*b;* and tying lobe 20*c* detached from tying lobe 20*d;* packaging member 12 unfolds to fit within the litter chamber of a conventional cat litter box 26. Packaging member 12 includes a supply of cat litter 28, with reference now to FIG. 3, that is contained within a rectangular box shaped cat litter cavity 30.

Packaging member 12 includes two shorter side perimeter edges 34,36 and two longer side perimeter edges 38,40 that define a rectangular shaped access opening 41. In this embodiment, cat litter 28 (FIG. 1) is sealed within cat litter cavity 30 by folding packaging member 12 in half across longer side perimeter edges 38,40 until the two shorter perimeter edges 34,36 are placed in registration with each other, tying lobe 20*a* contacts tying lobe 20*b,* and tying lobe 20*c* contacts 20*d*. The sealing of packaging member 12 is completed by applying middle side seam tape 18 over two shorter perimeter edges 34,36; applying left side seam tape 14 (FIG. 1) over the folded longer side perimeter edge 38; and applying right side seam tape 16 (FIG. 1B) over the folded longer side perimeter edge 40.

Figure 4:
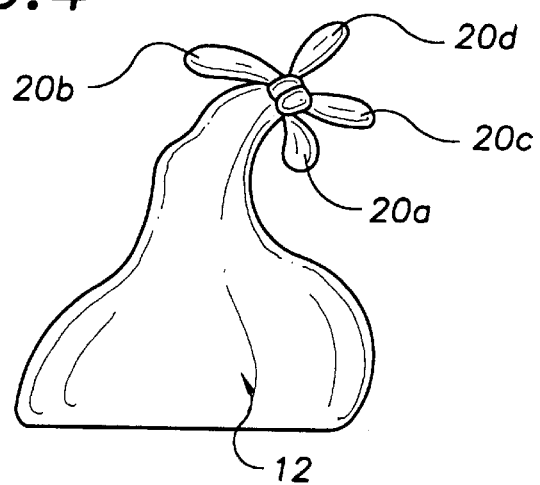
FIG. 4 is a plan side view showing the plastic film packaging member of FIG. 2 tied into the discarding configuration with the four restickable adhesive coated tying lobes tied into a knot sealing the used cat litter within the cat litter cavity for sanitary disposal.

With reference to FIG. 4, once the cat litter is used and ready for disposal, the pet owner can conveniently grasp tying lobes 20*a–d* and tie then into a knot to seal packaging member 12 for disposal of the cat litter 28 (FIG. 2).

It can be seen from the preceding description that a cat litter packaging article has been provided that contains a litter box quantity of cat litter; that can be used as a cat litter box liner as well as a sealable disposal bag for disposing of the used cat litter; and that includes a plastic film packaging member having a rectangular box shaped litter holding cavity that is accessible through a rectangular shaped opening defined by two longer side perimeter edges and two shorter side perimeter edges, the plastic film packaging member having four restickable adhesive coated tying lobes, one tying lobe extending from each corner formed by the intersection of a longer side and a shorter side perimeter edge; and a quantity of cat litter particles positioned within the litter holding cavity; the two shorter perimeter edges being in registration with each other and sealed together with a removable middle side seam tape, each of the four restickable adhesive coated tying lobes being adhesively secured to another one of the four restickable adhesive coated tying lobes, and each of the two longer perimeter edges being folded in half and sealed together with removable left and right side seam tapes to seal the quantity of cat litter particles within the litter holding cavity.

It is noted that the embodiment of the cat litter packaging article described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cat litter packaging article comprising:

a plastic film packaging member having litter holding cavity that is accessible through a rectangular shaped opening defined by two longer side perimeter edges and two shorter side perimeter edges, said plastic film packaging member having four restickable adhesive coated tying lobes, one tying lobe extending from each corner formed by said intersection of a longer side and a shorter side perimeter edge; and a quantity of cat litter particles positioned within said litter holding cavity;

said two shorter perimeter edges being in registration with each other and sealed together with a removable middle side seam tape, each of said four adhesive coated tying lobes being adhesively secured to another one of said four adhesive coated tying lobes, and each of said two longer perimeter edges being folded in half and sealed together, respectively, with removable left and right side seam tapes to seal said quantity of cat litter particles within said litter holding cavity.

2. The cat litter packaging article of claim 1, wherein:

said litter holding cavity is rectangular box shaped.

3. The cat litter packaging article of claim 2, wherein:

said opening of said litter holding cavity is rectangular shaped.

4. The cat litter packaging article of claim 1, wherein:

said opening of said litter holding cavity is rectangular shaped.

\* \* \* \* \*